(12) United States Patent  
Wang

(10) Patent No.: US 8,607,062 B2  
(45) Date of Patent: Dec. 10, 2013

(54) ELECTRONIC PASSWORD LOCK SYSTEM AND METHOD FOR ITS USE

(75) Inventor: Cho-Hao Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 24 days.

(21) Appl. No.: 13/339,550

(22) Filed: Dec. 29, 2011

(65) Prior Publication Data

US 2013/0054975 A1 Feb. 28, 2013

(51) Int. Cl.
*G06F 21/00* (2013.01)

(52) U.S. Cl.
USPC .................................. 713/185; 726/3; 726/27

(58) Field of Classification Search
None
See application file for complete search history.

(56) References Cited

U.S. PATENT DOCUMENTS

| 7,428,834 | B1 * | 9/2008 | Lee | 70/57 |
| 7,462,045 | B1 * | 12/2008 | Lee | 439/133 |
| 2005/0021954 | A1 * | 1/2005 | Kung | 713/168 |
| 2007/0132550 | A1 * | 6/2007 | Avraham et al. | 340/5.21 |
| 2007/0271112 | A1 * | 11/2007 | Davis | 705/1 |
| 2009/0085717 | A1 * | 4/2009 | Kirkjan | 340/5.2 |
| 2011/0084799 | A1 * | 4/2011 | Ficko | 340/5.65 |

* cited by examiner

*Primary Examiner* — Hadi Armouche
(74) *Attorney, Agent, or Firm* — Altis Law Group, Inc.

(57) ABSTRACT

A lock system includes a locker device and a USB key. The locker device includes a first USB connector, a password input unit and a control unit. The USB key includes a second USB connector for connection to the first USB connector, a memory unit, and a decrypting unit. The memory unit is configured for storing a password. The decrypting unit includes a password identification unit configured for determining whether a password inputted into the password input unit matches the password stored in the memory unit and producing a decrypting instruction if the inputted password matches the stored password. The locker device is configured for transmitting the inputted password to the USB key. The USB key is configured for transmitting the decrypted instruction to the locker device through the connected first and second USB connectors to enable the control unit to unlock the locker device.

7 Claims, 3 Drawing Sheets

ELECTRONIC PASSWORD LOCK SYSTEM AND METHOD FOR ITS USE

BACKGROUND

1. Technical Field

The present disclosure relates generally to electronic lock systems and is particularly directed to an electronic password lock system with a USB key and a method for using the same.

2. Description of Related Art

Lock systems are widely used in safes and real estate industry. A related lock system includes a locked box and a physical key. The lock box has a keyhole with a predetermined shape. The key has a shape corresponding to the keyhole. The lock box is unlocked by inserting and turning the key. However, the key can be copied very easily, thereby rendering the safes or the real estate at risk of being stolen.

Another one is an electronic password lock system. The electronic password lock system includes a lock box with a keypad or a dial formed thereon. The users can unlock the lock box by inputting a preset password by using the keypad or the dial. In this type of lock system, the physical key is not necessary. However, the lock system may be unsafe if the password is accidently known by others.

What is needed, therefore, is an electronic password lock system and a method for using the same, to overcome the above mentioned limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments will be described in detail below and with reference to the drawings.

Figure 1:
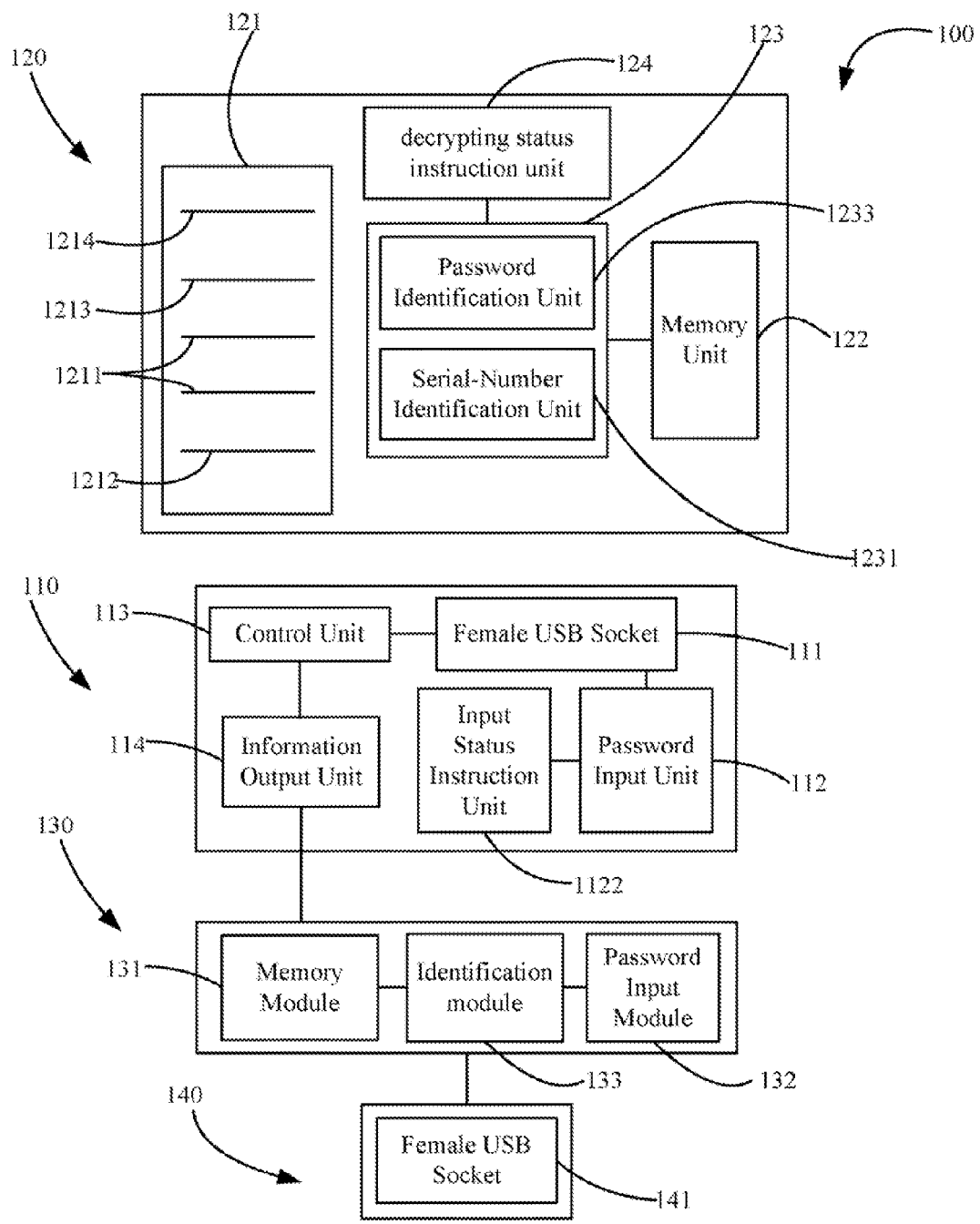
FIG. 1 is a schematic diagram of an electronic password lock system in accordance with an exemplary embodiment including a locker device and a USB key.

Referring to FIG. 1, an electronic password lock system 100 according to an exemplary embodiment includes a locker device 110, a USB key 120, a network database 130 and a computer 140. The locker device 110 and the computer 140 are in connection with the network database 130 via the internet or via a local area network.

The locker device 110 includes a female USB socket 111, an password input unit 112, an input status instruction unit 1122, a control unit 113 and an information output unit 114. The locker device 110 includes a unique serial number which is generally provided by the manufacturer or the administrator of the locker device 110.

In this embodiment, the password input unit 112 is a keypad for allowing a user to input a password. In an alternative embodiment, the password input unit 112 can also be a touch screen with an image of a keypad displayed thereon.

In this embodiment, the input status instruction unit 1122 is a buzzer. The input status instruction unit 1122 invites the input of a password into the password input unit 112 from the operator of the lock system 100. When the input status instruction unit 1122 produces a short beep, the password can be input by typing into the password input unit 112. When the input status instruction unit 1122 produces a series of short beeps, it means that an incorrect password has been inputted. When the password is input incorrectly for three times, the input status instruction unit 1122 may produce a long continuous beep. The input status instruction unit 1122 can be multi-color LED lamps and LCD display modules and the like.

The control unit 113 receives instructions transmitted from the USB key 120, and unlocks the locker device 110. The information output unit 114 transmits the lock status information of present unlocking of the locker device 130, such as the unlocking timing, the access information etc., to the network database 130. The access information means that the locker device 130 is unlocked or not at present.

The USB key 120 includes a male USB plug 121, a memory unit 122, a decrypting unit 123, and a decrypting status instruction unit 124. The USB key 120 includes a unique serial number corresponding to the serial number of the locker device 110. In an alternative embodiment, the USB key 120 can include a plurality of serial numbers corresponding to a plurality of locker devices 110. One serial number of the USB key 120 corresponds to only one serial number of the locker device 110.

The male USB plug 121 is matched with the female USB socket 111. The male USB plug 121 includes two data pins 1211, a power pin 1212, an earthing pin 1213, and a complementary data pin 1214. The complementary data pin 1214 is connected to the decrypting unit 123 for transmitting the serial number of the locker device 110 and the password inputted by using the password input unit 112 to the decrypting unit 123, and transmitting the decrypted information of the decrypting unit 123 to the locker device 110. The data pins 1211 transmit other information except for the information transmitted by the complementary data pin 1214, such as the information in the memory unit 122. The power pin 1212 is connected to a power supply for providing power to the USB key 120. The earthing pin 1213 is connected to ground.

The memory unit 122 stores the serial number of the USB key 120 and the password for decrypting the locker device 110. When the USB key 120 corresponds to a plurality of locker devices 110, the memory unit 122 can store a plurality of serial numbers and passwords corresponding to the plurality of locker devices 10.

The decrypting unit 123 includes a serial number identification unit 1231 and a password identification unit 1233. The serial number identification unit 1231 determines whether the memory unit 122 is storing a serial number of the USB key 120 corresponding to the serial number of the locker device 110. The password identification unit 1233 determines whether the password inputted with the password input unit 112 matches the password stored in the memory unit 122. When the passwords match, the password identification unit 1233 produces an decrypting instruction, and transmits the decrypting instruction is transmitted to the control unit 113.

The decrypting status instruction unit 124 is connected to the decrypting unit 123, and gives a warning as to the decrypting status of the decrypting unit 123. In this embodiment, the decrypting status instruction unit 124 is a double-color LED lamp capable of emitting red and green colors. The decrypting status instruction unit 124 shows the status of the decrypting unit 123 in the various manners described as follows: (1)

when the male USB plug 121 is inserted into and electrically connected to the female USB socket 111, and the serial number identification unit 1231 determines that the serial number stored in the memory unit 122 corresponds to that of the locker device 110, the decrypting status instruction unit 124 emits a red color and flashes; (2) if the serial-number identification unit 1231 determines that the serial number stored in the memory unit 122 does not correspond to that of the locker device 110, the decrypting status instruction unit 124 emits a constant red color; and (3) when the password inputted with the input unit 12 is correct, the decrypting unit 123 is activated and generates decrypted information for decrypting the locker device 110, and the decrypting status instruction unit 124 emits a flashing green color. Thus, the decrypting status instruction unit 124 can give warning as to whether the USB key 120 corresponds to the locker device 110 and whether the decrypting unit 123 has been activated.

The computer 140 includes a female USB socket 141 matching the male USB plug 121. The computer 140 is connected to the network database 130 via the internet or via a local area network.

The network database 130 includes a memory module 131, a password input module 132 and an identification module 133. The memory module 131 stores a plurality of serial numbers of one USB key 120 or of a plurality of USB keys 120 and the historical access information of the locker device 110, such as any timelocking of the locker device 110, the present lock status information and other information. The password input module 132 acts as an interface for accessing the network database 130. The user can input a password through the password input module 132, and then access the network database 130. The identification module 133 determines whether the serial number of the USB key 120 electrically connected to the computer 140 is stored in the memory module 131 and whether the password inputted with the password input module 132 is correct.

Figure 2:
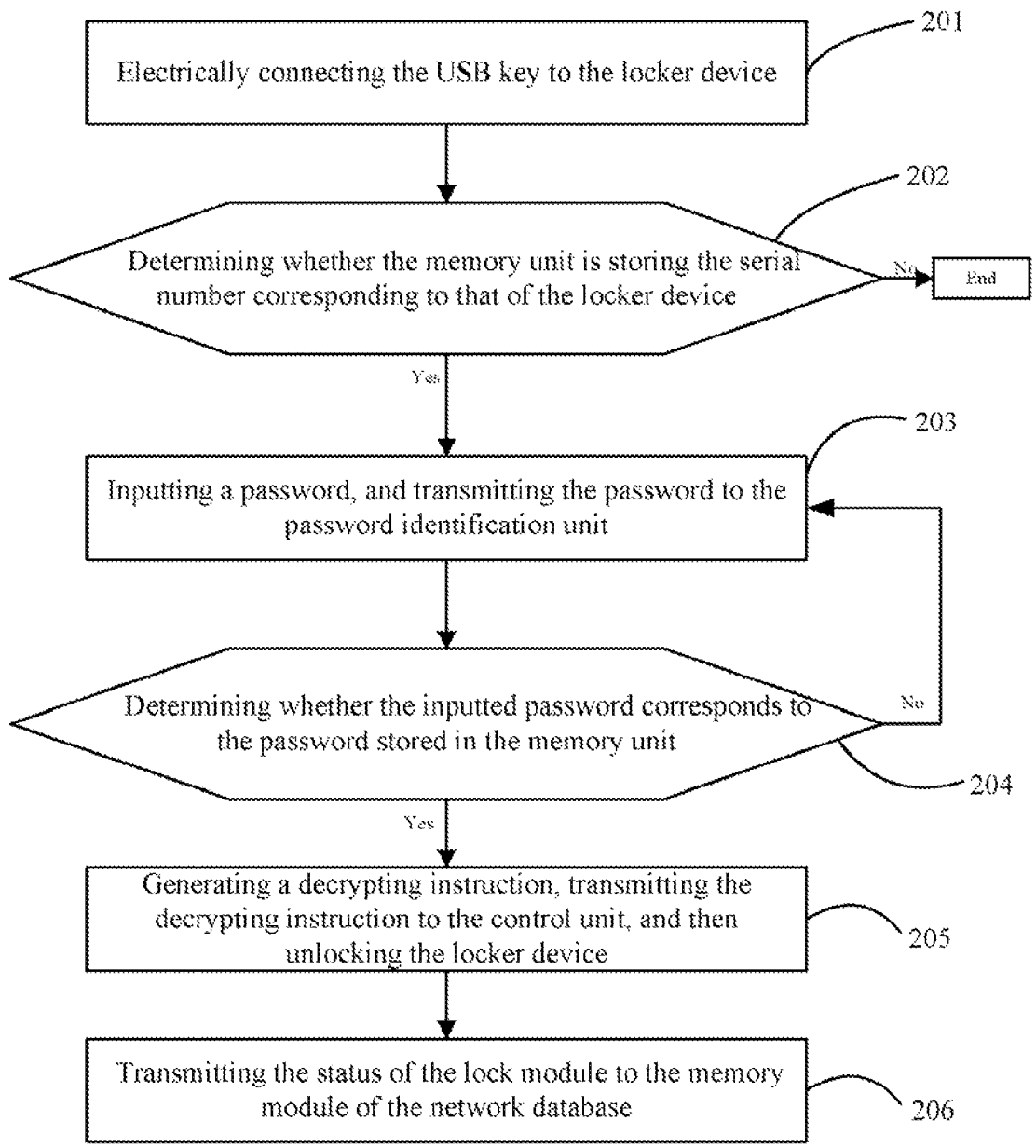
FIG. 2 is a flowchart illustrating one embodiment of a method of operation of the lock system of FIG. 1.

Referring also to FIG. 2, a method for unlocking the locker device 110 is provided as follows.

Step 201: the male USB plug 121 of the USB key 120 is inserted into the female USB socket 111 of the locker device 110, thereby electrically connecting the USB key 120 to the locker device 110.

Step 202: the serial number identification unit 1231 accesses the memory unit 122 to determine whether the memory unit 122 is storing the serial number corresponding to that of the locker device 110.

If the serial numbers in the memory unit 122 do not include the serial number corresponding to that of the locker device 110, the decrypting status instruction unit 124 emits a constant red color. It means that an incorrect USB key 120 is used, and another USB key 120 needs to be used.

If the serial numbers in the memory unit 122 includes the serial number corresponding to that of the locker device 110, the decrypting status instruction unit 124 emits red flashing color. Also, the input status instruction unit 1122 produces a short beep to remind the user to input the password.

Step 203: the password is input through the password input unit 112, and the inputted password is transmitted to the password identification unit 1233 via the complementary data pin 1214 of the male USB plug 121.

Step 204: the password identification unit 1233 accesses the memory unit 122 to determine whether the inputted password corresponds to the password stored in the memory unit 122.

If the inputted password does not match, the input status instruction unit 1122 produces a series of short beeps to remind the user to input the correct password the second time round. If the inputted password is correct, the decrypting status instruction unit 124 emits green light and flashes, and the next step follows.

Step 205: the password identification unit 1233 generates a decrypting instruction, and the decrypting instruction is transmitted to the control unit 113 via the complementary data pin 1214 of the male USB plug 121. Then, the control unit 113 unlocks the locker device 110 based on the decrypting instruction.

Step 206: the status of the locker device 110 is transmitted to the memory module 131 of the network database 130 via the information output unit 114. The information as to status includes the unlocking timing of the locker device 110, the present status of the locker device 110, and other information.

Figure 3:
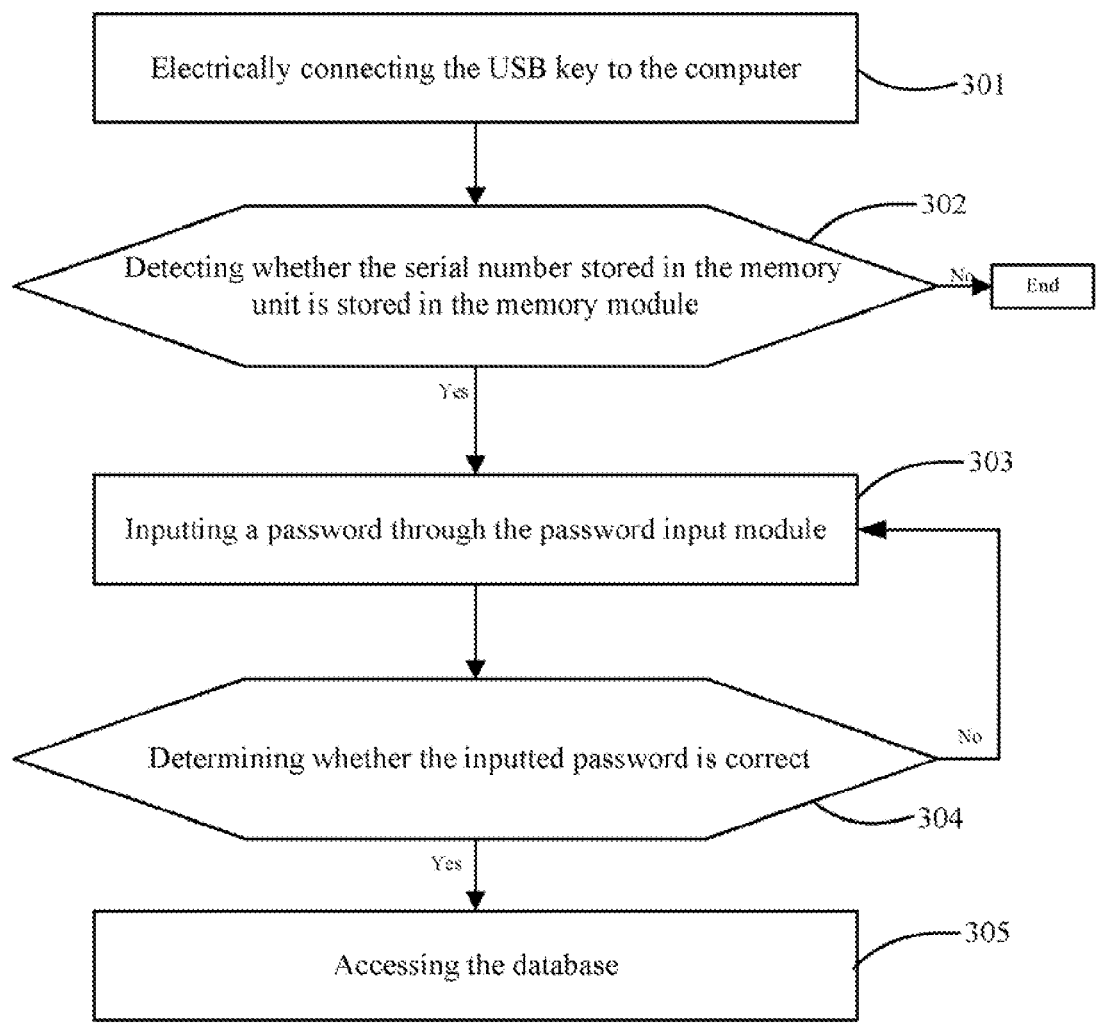
FIG. 3 is another flowchart illustrating one embodiment of a method of monitoring the operation of the locker device of FIG. 1.

Referring to FIG. 3, a method of monitoring the locker device 110 is provided. The method includes the steps as follows.

Step 301: the male USB plug 121 is inserted into the female USB socket 141 to electrically connect the USB key 120 to the computer 140.

Step 302: the identification module 133 automatically detects whether the serial number stored in the memory unit 122 is stored in the memory module 131 of the database 130.

If the serial number stored in the memory unit 122 is not stored in the memory module 131 of the database 130, access to the database 130 will be denied.

If the serial number stored in the memory unit 122 is stored in the memory module 131 of the database 130, the next step follows.

Step 303: a password is inputted through the password input module 132.

Step 304: the identification module 133 determines whether the inputted password is correct. If the inputted password is incorrect, access to the network database 130 will be denied. If the inputted password is correct, the next step follows.

Step 305: the database 130 can be accessed. In the network database 130, the historical access information of the locker device 110 can be read, such as the timelock settings, the present lock status information, and other information.

In the lock system 100 of this embodiment, not only is the USB key 120 corresponding to the locker device 110 necessary, but the password is also needed. This makes the lock system 100 more secure. In addition, the USB key 120 can include more than one serial number stored in the memory unit 122, thereby corresponding to more than one locker device 110. Therefore, more than one locker device 110 can be unlocked with just one USB key 120. In this situation, the passwords corresponding to different locker devices 110 can be different. Moreover, with the network database 130, the locker devices 110 can be monitored. This is especially convenient for a large storehouse accommodating a plurality of safes or containers, each of which includes a locker device 110.

While certain embodiments have been described and exemplified above, various other embodiments will be apparent to those skilled in the art from the foregoing disclosure. The present disclosure is not limited to the particular embodiments described and exemplified but is capable of considerable variation and modification without departure from the scope of the appended claims.

What is claimed is:

1. A lock system, comprising:
 a locker device comprising a first USB connector, a password input unit configured for allowing a user to input a password, and a control unit configured for unlocking the locker device, the locker device comprising a unique first serial number;

a USB key comprising a second USB connector for connection to the first USB connector, a memory unit, and a decrypting unit, the memory unit being configured for storing a password for unlocking the locker device and a unique second serial number, the decrypting unit comprising a serial number identification unit configured for determining whether the second serial number matches the first serial number, a password identification unit configured for determining whether a password inputted into the password input unit matches the password stored in the memory unit and producing a decrypting instruction to unlock the locker device if the inputted password matches the stored password, the locker device configured for transmitting the inputted password to the USB key through the connected first and second USB connectors, the USB key configured for transmitting the decrypted instruction to the locker device through the connected first and second USB connectors to enable the control unit to unlock the locker device; and a network database and a computer, the locker device and the computer being in connection with the network database, the locker device further comprising an information output unit, the information output unit being configured for transmitting lock status information of the locker device to the network database, the computer comprising a third USB connector for connection to the second USB connector, to allow the USB key to access the network database, the network database comprising a memory module, a password input module and an identification module, the memory module being configured for storing historical access information of the locker device and a plurality of serial numbers of the USB key, the password input module being configured for inputting a password for accessing the network database, the identification module being configured for determining whether the second serial number of the USB key electrically connected to the computer is stored in the memory module and whether a password input into the password input module is correct.

2. The lock system of claim 1, wherein the memory unit stores a plurality of serial numbers, each of which matches a unique locker device.

3. The lock system of claim 1, wherein the USB key further comprises a decrypting status instruction unit connected to the decrypting unit, the decrypting status instruction unit being configured for giving a warning as to the decrypting status of the decrypting unit.

4. The lock system of claim 1, wherein the USB key further comprises an input status instruction unit configured for giving a warning as to correctness of a password input into the password input unit.

5. A method for unlocking a locker device using the lock system of claim 1, comprising:
   electrically connecting the USB key to the locker device by electrically connecting the first USB connector with the second USB connector;
   inputting the password into the password input unit;
   producing a decrypting instruction based on the inputted password with the decrypting unit;
   transmitting the decrypting instruction to the control unit of the locker device through the connected first and second USB connectors;
   unlocking the locker device based on the decrypting unit with the control unit;
   electrically connecting the USB key to the computer, the computer being in connection with the network database, the network database storing historical access information of the locker device;
   the identification module of the automatically detecting whether the serial number stored in the memory unit is stored in the memory module of the database, if the serial number stored in the memory unit not stored in the memory module of the database, access to the database denied, if the serial number stored in the memory unit stored in the memory module of the database, the next step following; and
   inputting a password into a password input module of the network database to access the network database, thereby obtaining the historical access information of the locker device associated with the USB key.

6. The lock system of claim 4, wherein the input status instruction unit is a buzzer configured to produce a series of short beeps if an incorrect password has been inputted, or produce a long continuous beep if the password is input incorrectly for three times.

7. The lock system of claim 3, wherein the decrypting status instruction unit is a double-color LED lamp capable of emitting red and green colors, when the second USB connector inserted into and electrically connected to the second USB connector, and the serial number identification unit determining that the second serial number stored in the memory unit corresponds to first serial number of the locker device, the decrypting status instruction unit emitting a red color and flashing, when the serial-number identification unit determining that the second serial number stored in the memory unit does not correspond to the first serial number of the locker device, the decrypting status instruction unit emitting a constant red color, when the password inputted with the input unit is correct, the decrypting status instruction unit emitting a flashing green color.

* * * * *